US006984910B2

(12) United States Patent
Down et al.

(10) Patent No.: US 6,984,910 B2
(45) Date of Patent: Jan. 10, 2006

(54) GENERATOR WITH COMPOSITE ROTOR COIL RETENTION COMPONENTS

(75) Inventors: Edward M. Down, Tucson, AZ (US); Kieran Doherty, Oro Valley, AZ (US); David E. Stout, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 100 days.

(21) Appl. No.: 10/341,161

(22) Filed: Jan. 13, 2003

(65) Prior Publication Data

US 2005/0231058 A1 Oct. 20, 2005

(51) Int. Cl.
H02K 21/12 (2006.01)

(52) U.S. Cl. .................. 310/192; 310/214; 310/261; 310/262

(58) Field of Classification Search ................ 310/194, 310/262, 261, 214, 215
See application file for complete search history.

(56) References Cited

U.S. PATENT DOCUMENTS

| | | | | |
|---|---|---|---|---|
| 3,500,093 A | * | 3/1970 | Wharton et al. ............ | 310/214 |
| 3,735,169 A | * | 5/1973 | Balke et al. ................ | 310/214 |
| 3,739,212 A | * | 6/1973 | Koelbel et al. ............. | 310/194 |
| 4,200,818 A | | 4/1980 | Ruffing et al. .............. | 310/214 |
| 4,385,248 A | | 5/1983 | Laskaris ...................... | 310/52 |
| 4,443,725 A | | 4/1984 | Derderian et al. .......... | 310/214 |
| 4,473,765 A | | 9/1984 | Butman, Jr. et al. ........ | 310/215 |
| 4,653,265 A | | 3/1987 | Stahlecker et al. .......... | 57/406 |
| 5,140,204 A | * | 8/1992 | Cashmore et al. .......... | 310/214 |
| 5,736,803 A | * | 4/1998 | Masson ....................... | 310/261 |
| 6,242,825 B1 | | 6/2001 | Mori et al. .................. | 310/45 |
| 6,313,561 B1 | | 11/2001 | Nygard et al. .............. | 310/261 |
| 6,492,754 B1 | * | 12/2002 | Weiglhofer et al. ......... | 310/261 |
| 2004/0004407 A1 | * | 1/2004 | Laurent et al. ........ | 310/156.48 |
| 2004/0263019 A1 | * | 12/2004 | Buchan et al. .............. | 310/214 |

FOREIGN PATENT DOCUMENTS

DE 550943 * 5/1932

* cited by examiner

Primary Examiner—Darren Schuberg
Assistant Examiner—Jaydi A. Aguirrechea
(74) Attorney, Agent, or Firm—Ingrassia Fisher & Lorenz (57) ABSTRACT

A coil retention system for a rotor of an electrical generator, such as an aircraft generator, that includes one or more components made of a high strength, lightweight composite material. By making one or more of the coil retention system components of a high strength, lightweight composite material, the generator can rotate at relatively high speeds, and can be built with a relatively small space between the generator rotor and stator. This allows the generator to supply greater output power without increasing the generator's size and/or weight.

25 Claims, 6 Drawing Sheets

GENERATOR WITH COMPOSITE ROTOR COIL RETENTION COMPONENTS

FIELD OF THE INVENTION

The present invention relates to generators and, more particularly, to generators that are used with gas turbine engines such as those used in aircraft, tanks, ships, terrestrial vehicles, or other applications.

BACKGROUND OF THE INVENTION

A generator system for a gas turbine engine, such as that found in aircraft, ships, and some terrestrial vehicles, may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a generator control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator, and this three-phase AC output can then be provided to a load such as, for example, an aircraft, ship, or vehicle electrical system.

Because some aircraft generators have potential rotational speeds up to and in excess of 24,000 rpm, potentially large centrifugal forces may be imposed upon the rotors in generators during operation. Given these potentially stressful operating conditions, the rotors are carefully designed and manufactured, so that the rotors are precisely balanced and reliable. Improper balancing not only can result in inefficiencies in the operation of a generator, but may also affect the reliability of the generator.

Among the components that can affect reliability and proper balancing of the rotors are the wire coils wound on the rotor. The centrifugal forces experienced by a rotor may be strong enough to cause bending of the wires of these coils so that the wires then extend into what is known as the interpole region. Over time, such bending can result in mechanical breakdown of the wires and compromise of the coil insulation system. Additionally, because the coils are assemblies of individual wires that can move to some extent with respect to one another and with respect to the remaining portions of the rotors, the coils are a potential source of imbalance within the rotor, which can lead to reduced reliability and can potentially compromise the insulation system. Even asymmetrical movements of these coils on the order of only a few thousandths of an inch can, in some instances, be significant to the performance of the generator.

In order to improve the strength and reliability of the wire coils and the coil insulation system, and to minimize the amount of imbalance in the rotors that may occur due to the wire coils, the rotors may include a coil retention system. With a coil retention system, substantially rigid interpole wedges are inserted in between neighboring poles of the rotors to reduce the likelihood of coil wire bending or movement. The interpole wedges, which can be constructed of high strength, lightweight metals, are held in place by interpole retainer wedges. The interpole retainer wedges, which can be constructed of titanium, or other high-strength, lightweight metals, are typically located between an upper surface of neighboring rotor coils and the pole tips of the neighboring poles.

The mass of the coil and the coil retention system results in a centrifugal force being developed as the rotor rotates these components. With the above-described coil retention system configuration, this centrifugal force is restrained by the pole tips. The overall centrifugal force magnitude that is developed during rotor rotation is influenced by various factors, including the rotational mass, the radius of rotation of the rotational mass, and the rotational speed. In recent years, the demand for lower weight, higher power generators has increased, which has resulted in generators with rotors that rotate faster and have larger diameters than previously designed rotors. As just noted, both of these factors tend to increase the centrifugal loading on the coil retention system.

Although presently designed coil retention systems are capable of providing the above-described benefits at relatively lower rotational rotor speeds, the design of these conventional retention systems limits their effectiveness. In particular, the loading on the conventional retention system components may exceed the structural capabilities of the components at relatively high rotor rotational speeds. Although stronger metallic materials could be used, this may increase the weight and/or size and/or cost of the generator. Moreover, while some lightweight composite materials have been used in some portions of the generator, the present inventors did not consider these to have sufficient strength to be used in the coil retention system.

Hence, there is a need for a coil retention system for use in generators that can withstand the centrifugal loads imposed at relatively high rotor rotational speeds and/or does not significantly increase generator weight and/or size and/or cost. The present invention addresses one or more of these needs.

SUMMARY OF THE INVENTION

The present invention provides a coil retention system that may be used in the rotor of a generator and that can withstand the centrifugal loads that may be imposed when the rotor rotates at relatively high speeds. The coil retention system does not significantly increase the size and/or weight of the generator.

In one embodiment, and by way of example only, a generator includes a stator and a rotor. The rotor is rotationally mounted at least partially within at least a portion of the stator, and includes a shaft, at least a first and a second pole, a first and a second coil, and an interpole retainer wedge. Each pole extends radially outwardly from the shaft and is spaced apart from one another to form an interpole region therebetween. The first coil is on the first pole and has at least an outwardly facing edge facing generally away from the shaft. The second coil is on the second pole and has at least an outwardly facing edge facing generally away from the shaft. The interpole retainer wedge is positioned over at least a portion of the interpole region and is disposed between the first and second coil outwardly facing edges and surfaces of the first and second poles. The interpole retainer wedge is constructed of a composite material.

In another exemplary embodiment, a rotor for use in a generator includes a shaft, at least a first and a second pole, a first and a second coil, and an interpole retainer wedge. Each pole extends radially outwardly from the shaft and is spaced apart from one another to form an interpole region therebetween. The first coil is on the first pole and has at least an outwardly facing edge facing generally away from the shaft. The second coil is on the second pole and has at least an outwardly facing edge facing generally away from the shaft. The interpole retainer wedge is positioned over at least a portion of the interpole region and is disposed between the first and second coil outwardly facing edges and surfaces of the first and second poles. The interpole retainer wedge is constructed of a composite material.

In yet another exemplary embodiment, for placement in an interpole region formed between adjacent coil wound poles of a generator rotor includes an intermediate section, a first side section, and a second side section. The first and second side sections each extend from the intermediate section, and are dimensioned to fit between one or more surfaces of the coils and one or more surfaces of the adjacent poles. The wedge retainer is constructed of a composite material.

Other independent features and advantages of the preferred generator and coil retention system will become apparent from the following detailed description, taken in conjunction with the accompanying drawings which illustrate by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present embodiment is, for convenience of explanation, depicted and described as being implemented in a brushless AC (alternating current) generator, it will be appreciated that it can be implemented in other electric machines needed in specific applications.

Figure 1:
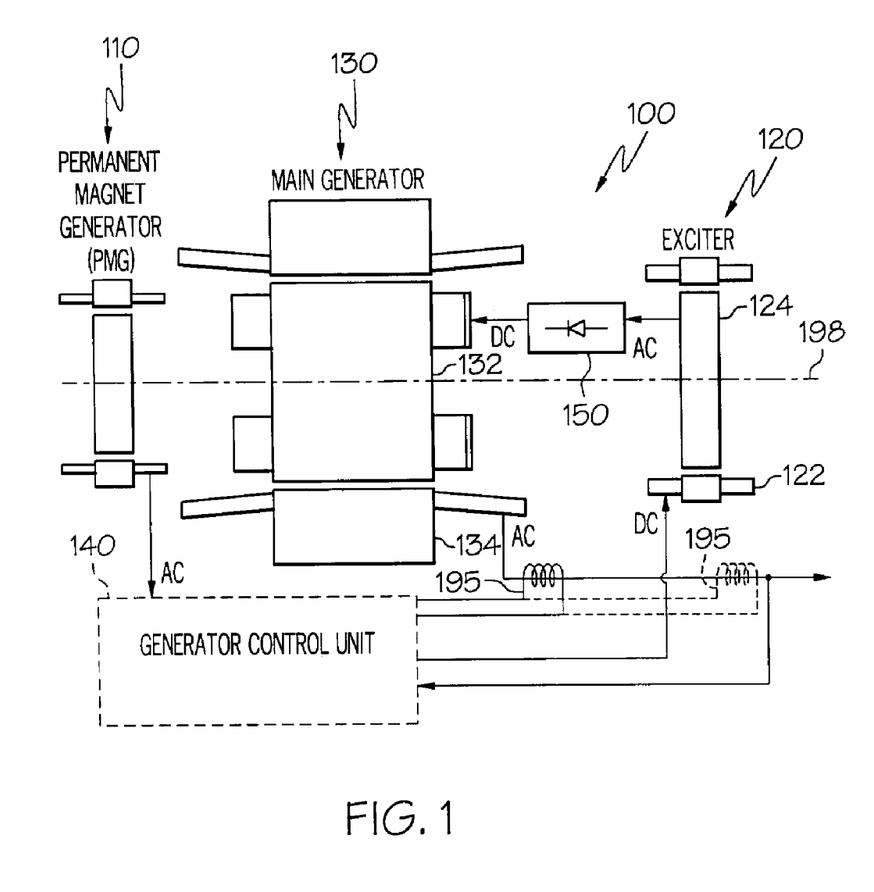
FIG. 1 is a functional schematic block diagram of an exemplary generator system.

Turning now to the description, and with reference first to FIG. 1, a functional schematic block diagram of an exemplary generator system 100 for use with a gas turbine engine such as that in an aircraft is depicted. This exemplary generator system 100, which is commonly known as a brushless AC generator, includes a permanent magnet generator (PMG) 110, an exciter 120, a main generator 130, a generator control unit 140, and one or more rectifier assemblies 150. During operation, a rotor 112 of the PMG 110, a rotor 124 of the exciter 120, and a rotor 132 of the main generator 130 all rotate. The rotational speed of these components may vary. In one embodiment, the rotational speed may be, for example, in the range of about 12,000 to about 24,000 r.p.m., or greater. As the PMG rotor 112 rotates, the PMG 110 generates and supplies AC power to the generator control unit 140, which in turn supplies direct current (DC) power to a stator 122 of the exciter 120. The exciter rotor 124 in turn supplies AC power to the rectifier assemblies 150. The output from the rectifier assemblies 150 is DC power and is supplied to the main generator rotor 132, which in turn outputs AC power from a main generator stator 134.

Figure 2:
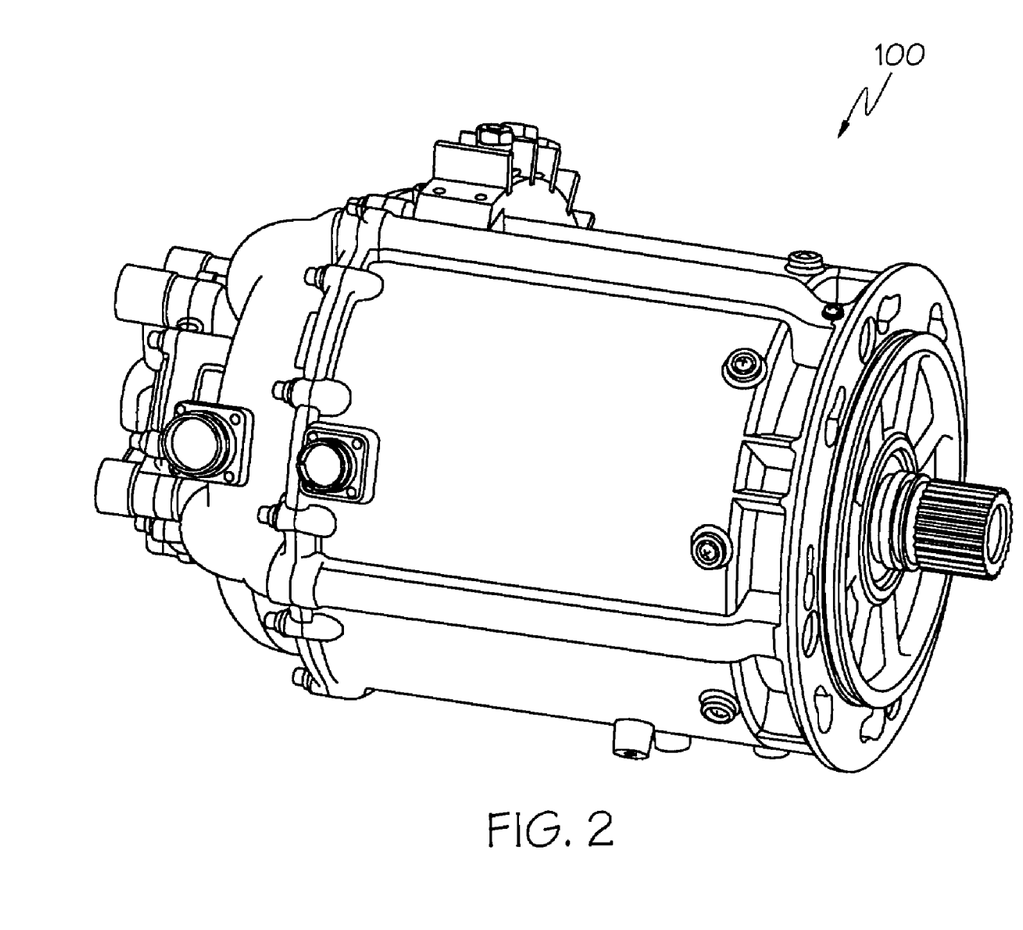
FIG. 2 is a perspective view of a physical embodiment of the generator system depicted in FIG. 1.

The generator system 100 is capable of providing output power at a variety of frequencies and over a variety of frequency ranges. Further, typically the output power from the main generator stator 134 is three-phase AC power. The generator control unit 140 can regulate the power output based upon monitoring signals provided to it from monitoring devices 195. In the depicted embodiment, the PMG rotor 112, the exciter rotor 124, and the main generator rotor 132 all rotate along a single axis 198 at the same rotational speed. It will be appreciated, however, that in other embodiments the PMG rotor 112 may rotate along a different axis. Moreover, the relative positioning of the PMG 110, the exciter 120, and the main generator 130 can be modified in different embodiments such that the exciter 120 is physically between the PMG 110 and the main generator 130. A perspective view of a physical embodiment of at least those portions of the generator system 100 that are mounted within a generator housing 200 is provided in FIG. 2.

Figure 3:
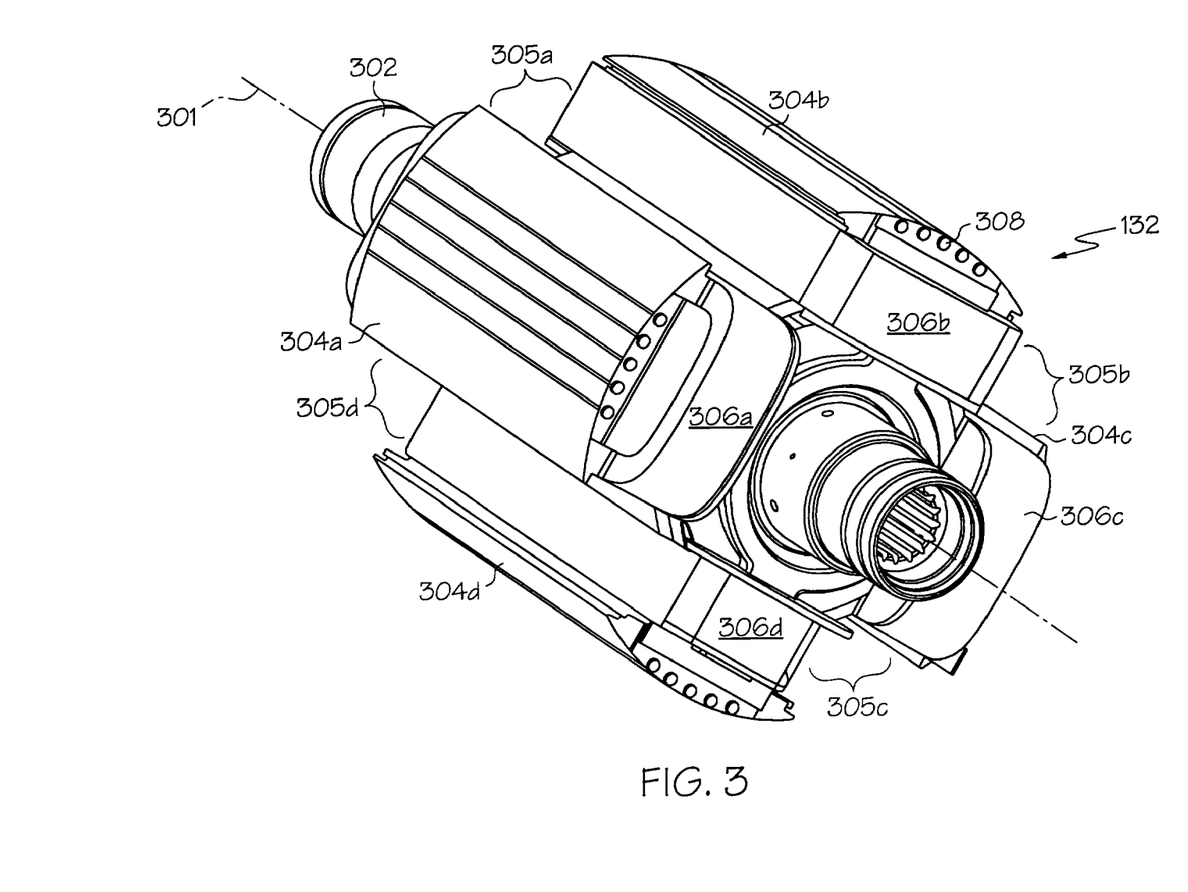
FIG. 3 is a perspective view of an exemplary embodiment of a rotor that may be used in the generator depicted in FIG. 2.

Turning now to FIG. 3, a perspective view of an exemplary embodiment of the main generator rotor 132 is depicted. As shown, the rotor 132 includes a shaft 302, a plurality of poles 304a–d, and a plurality of coils 306a–d. The shaft 302 extends axially through the rotor 132 along an axis 301. Each of the poles 304a–d extends radially away from the shaft 302 and are generally spaced evenly apart from one another, forming an interpole region 305a–d between adjacent poles 304a–d. In addition, a plurality of weights 308 may be embedded within each of the poles 304a–d to provide proper balancing of the rotor 132. As noted above, the depicted rotor 132 is designed for use in a generator, such as those commonly employed in aircraft. Thus, the components of the rotor 132 are typically manufactured from high-strength materials. For example, the poles 304a–d may be formed from steel, while the shaft 302 may be formed from steel, titanium, or high-strength aluminum. It will be appreciated, however, that these materials are only exemplary of a preferred embodiment and that other suitable materials can be employed. Moreover, although the rotor 132 depicted in FIG. 3 is a four-pole rotor, it will be appreciated that the present invention may be used with rotors having other numbers of poles.

Figure 4:
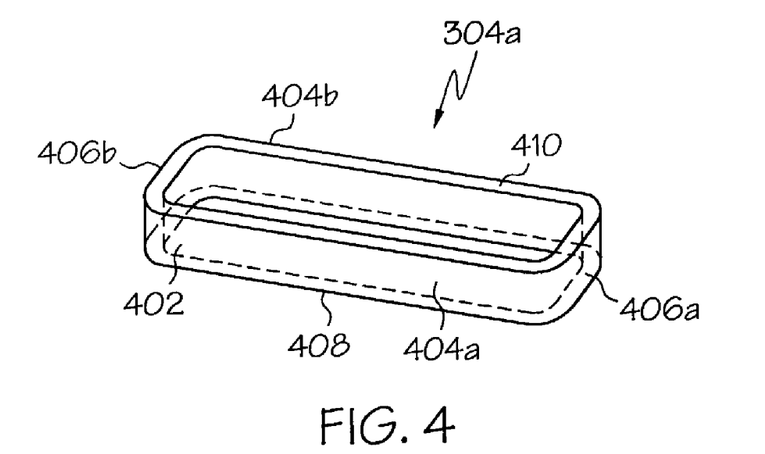
FIG. 4 is a perspective view of an exemplary embodiment of a rotor coil that may be used with the rotor depicted in FIG. 3.

The coils 306a–d are wrapped, one each, around a respective pole 304a–d, and are preferably formed by wrapping numerous individual wire windings around the respective poles 304a–d. For clarity, one of the coils 306a, which is representative of each of the coils 306a–d, is depicted in FIG. 4. As illustrated in this figure, the coil 306a includes an outer surface 402 around the outer perimeter of the coil that is formed from the outermost layer of wire windings of the coil 306a. The outer surface 402 includes two sides 404a,b and two end turns 406a,b. The outer surface sides 404a,b are made up of wire segments that are wrapped across the sides of the pole 304a and that predominantly follow directions parallel to the axis 301. In contrast, the end turns 406a,b are made up of wire segments that loop around the ends of the pole 304a and that follow paths that are predominantly within planes that are perpendicular to the axis 301. The coil 306a also includes an inward-facing edge 408, which faces the shaft 302, and an outward-facing edge 410, which faces away from the shaft 302. It is noted that the coils 306a–d may be formed of any one of numerous conductors, but in a preferred embodiment are formed from.

Figure 5:
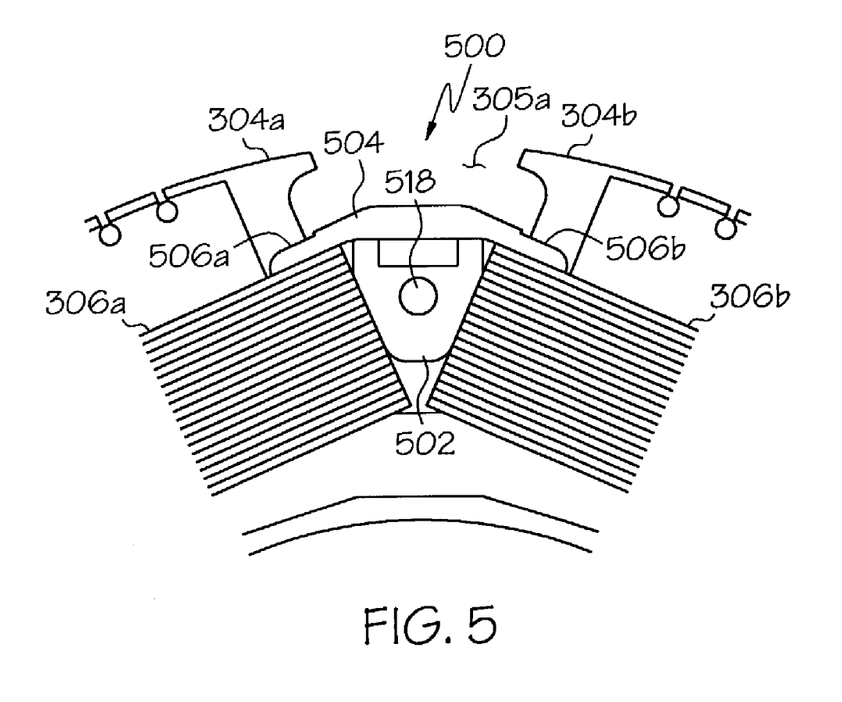
FIG. 5 is a partial end view of the rotor depicted in FIG. 2 with a coil retention system installed.

As was noted above, many generators include a coil retention system to improve the strength and reliability of the coils 306a–b, to increase the life of the coil insulation system, and to minimize any rotor imbalance that may occur from movement of the coils 306a–d. Turning now to FIG. 5, a detailed description of a particular embodiment of a coil retention system 500 will be provided. For clarity, it is noted that only two poles 304a,b, two coils 306a,b, and a single wedge retention system 500 are depicted in FIG. 5. However, it is to be appreciated that this figure is representative of the remainder of the poles 304c,d, coils 306c,d, and retention systems 500. As FIG. 5 illustrates, the coil retention system 500 includes an interpole wedge 502 and an interpole retainer wedge 504. Before proceeding further, it should be appreciated that although the depicted coil retention system 500 includes an interpole wedge 502 and an interpole retainer wedge 504, the coil retention system 500 could alternatively include only the interpole retainer wedge 504 and not the interpole wedge 502.

In the depicted embodiment, however, the interpole wedge 502 fits into the interpole region 305a between the coils 306a,b of adjacent poles 304a,b, thereby providing lateral support for the coils 306a,b. The interpole retainer wedge 504 is placed over, and in contact with, the interpole wedge 502, and is disposed between the coils 306a,b and pole tips 506a,b of the respective poles 304a,b. Although not depicted, it is noted that a layer of an electrical insulation material such as, for example, dielectric paper, is positioned between the coils 306a,b and the interpole wedge 502 and the interpole retainer wedge 504.

Figure 6:
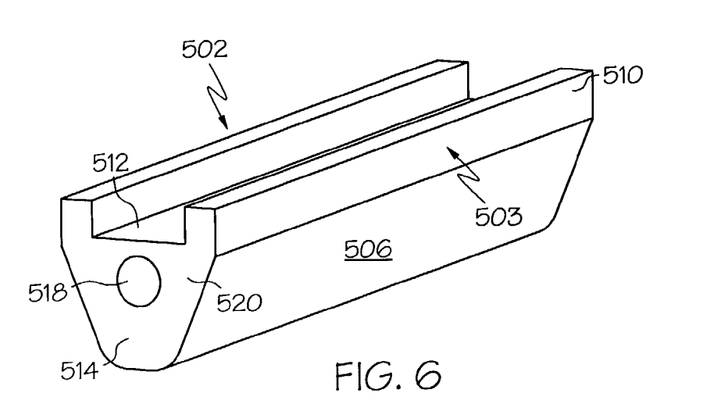
FIGS. 6 and 7 are perspective view and cross section views, respectively, of an exemplary coil retention interpole wedge according to an embodiment of the present invention.
Figure 7:
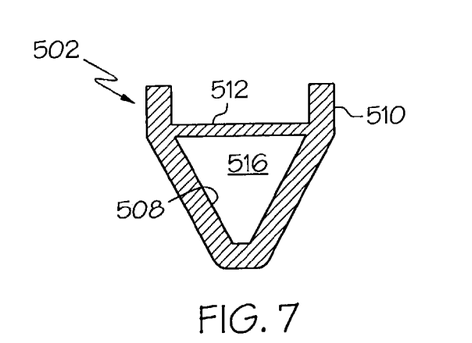

As shown more particularly in FIGS. 6 and 7, which depict a perspective view of the interpole wedge 502 and a cross section view of the interpole wedge 502, respectively, it is seen that the interpole wedge 502 has a longitudinally extending main body 503 that is generally V-shaped in cross section, and includes an inner surface 508, an outer surface 510, a top plate 512, and two end plates 514 (though only one is visible). Together, the inner surface 508 and top plate 512 form a passage 516 that extends through the entire length of the interpole wedge 502. Forming the interpole wedge 502 with the passage 516 reduces the overall weight of the interpole wedge 502 when compared with a solid wedge, thus reducing the overall centrifugal loading on the rotor 132. The two end plates 514 each include an opening 518 into the passage 516. These openings 518 allow a cooling medium (e.g., air, oil, or other fluid) to flow through the passage 516, which assists in removing heat from the coils 306a,b. The top plate 512 provides lateral strength for the interpole wedge 502. It will be appreciated that the generally V-shaped cross section is merely exemplary of a preferred embodiment and that the interpole wedges 502 may have other cross sectional shapes, and that other interpole wedge geometries such as, for example, an open vee wedge design, may also be used.

Figure 8:
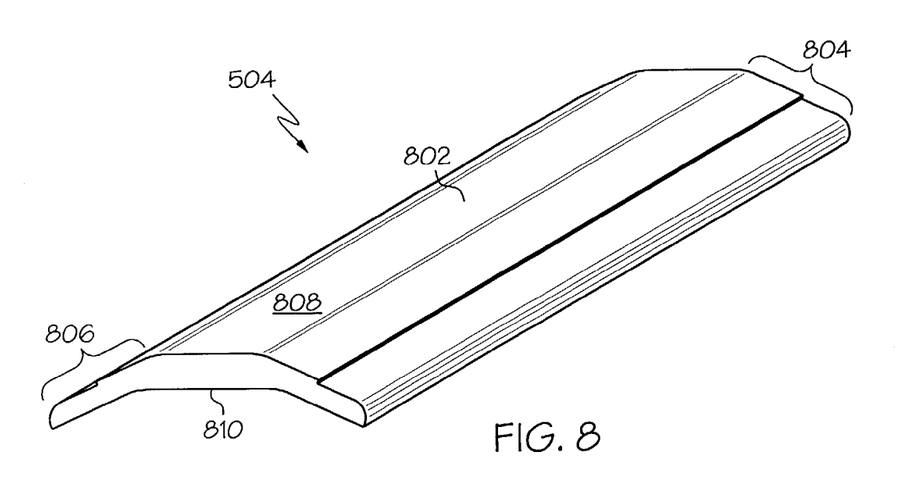
FIG. 8 is a perspective view of an exemplary wedge retainer according to an embodiment of the present invention.

The interpole retainer wedge 504, as depicted more clearly in FIG. 8, includes a main body 802 and two sides 804, 806. The main body 802 extends longitudinally, and has an upper surface 808 and a lower surface 810. The two sides 804, 806, which are preferably tapered, extend from the main body 802 and, in the depicted embodiment, do so at a predetermined angle relative to the plane of the main body 802. Thus, as shown in FIG. 5, the lower surface 810 of the main body 802 is placed over, and in contact with, at least a portion of the interpole wedge 502. In addition, one of the sides 804 of the interpole retainer wedge 504 is disposed between the outwardly facing edge 408 of one of the coils 306a and the pole tip 506a of its corresponding pole 304a, and the other side 806 is disposed between the outwardly facing edge 408 of the other coil 306b and the pole tip 506b of its corresponding pole 304b. One or more shims (not illustrated) may be placed between the outwardly facing edges 408 of the coils 306a,b and the sides 804, 806 of the interpole retainer wedge 504, or between the sides 804, 806 of the interpole retainer wedge 504 and the pole tips 506a, 506b, to provide a tight fit. However, as shown in FIG. 5, the interpole wedge 502 and interpole retainer wedge 504 are preferably dimensioned so that shims need not be used.

The interpole wedge 502 and interpole retainer wedge 504 are each formed from a relatively high strength, lightweight material and may, in some cases, be formed of the same material. However, in a particular preferred embodiment the interpole wedge 502 and interpole retainer wedge 504 are formed of different materials. For example, the interpole wedge 502 is preferably formed from a high strength, relatively lightweight metal such as, for example, Inconel, titanium, a titanium alloy, or aluminum. The interpole retainer wedge 504 is preferably formed of relatively high strength, lightweight composite material such as, for example, a metal matrix composite, or a polymer matrix composite. As is generally known, metal matrix composites typically have a metal base with a non-metallic reinforcing constituent, such as a ceramic material. Non-limiting examples of metal matrix composites include, but are not limited to, an aluminum base with a boron or carbide reinforcing constituent. One particular metal matrix composite that may be used is sold under the trade name Nextel 610/Aluminum. Non-limiting examples of polymer matrix composites include ceramic fibers in epoxy, such as carbon fibers in epoxy, boron fibers in epoxy, and silicon carbide fibers in epoxy. It should be appreciated that the interpole wedge 502 could be formed of a lightweight, high strength composite material, while the wedge retainer 504 is formed of a lightweight, high strength metal. It should additionally be appreciated that the interpole wedge 502 and interpole retainer wedge 504 could both be formed of the same, or different, composite materials.

Figure 9:
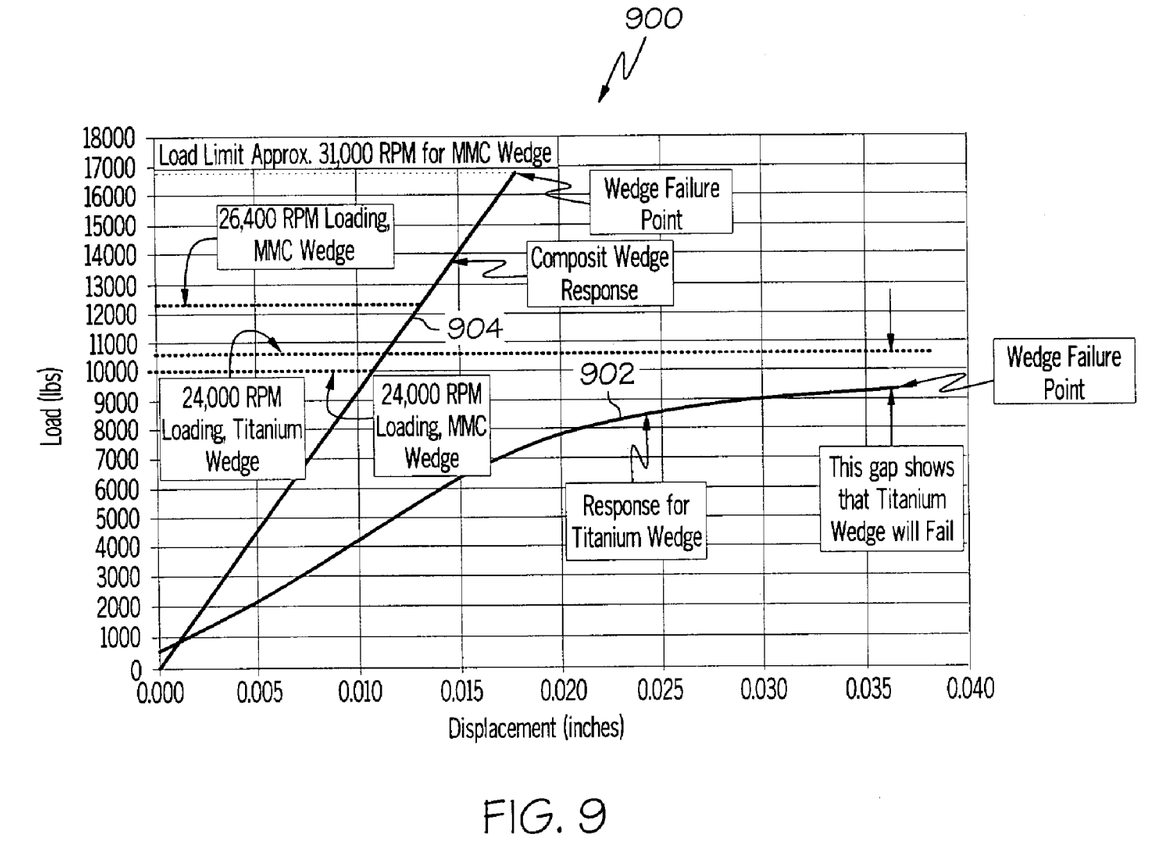
FIG. 9 is a graph showing wedge retainer load and displacements at various rotational speeds of a main rotor for two different wedge retention systems.

One of the purposes of the interpole wedges 502 is to restrain the coils 306a–d from moving away from the poles 304a–d. This restraining force is transmitted through each of the interpole wedges 502 to its associated interpole retainer wedge 504. Thus, by forming all, or at least a portion, of the wedge retention system 500 of a lightweight, high strength composite material, allows the main rotor 132 to rotate significantly faster, and be built with a larger diameter and smaller air gap between the main rotor 132 and main stator 134, as compared to a generator that uses a fully metallic wedge retention system 500. As an example of the surprising and unexpectedly significant increased capabilities the present inventors have discovered, reference should now be made to FIG. 9, which is a graph 900 of an interpole wedge retainer load and displacements at various rotational speeds of a main rotor 132 for two different wedge retention systems. A first wedge retention system (represented by curve 902) includes an interpole wedge 502 made of Inconel and an interpole wedge retainer 504 made of titanium, and a second wedge retention system (represented by curve 904) includes an interpole wedge 502 made of Inconel and an interpole wedge retainer 504 made of the Nextel 610/ Aluminum metal matrix composite. This graph indicates that the first wedge retention system 902 will fail before the main rotor 132 reaches a rotational speed of 24,000 r.p.m., and will undergo a significant amount of displacement (e.g., greater than 0.035 inches) at its maximum pre-failure speed. Conversely, the second wedge retention system 904 does not fail until the main rotor 132 reaches 31,000 r.p.m, and undergoes less than 0.020 inches of pre-failure displacement.

A wedge retention system 500 that has at least the interpole retainer wedge 504 made of a lightweight, high strength composite material, allows the main rotor 132 into which the wedge retention system 500 is installed to rotate at speeds that are significantly higher than with presently designed wedge retention systems 500. In addition, because a wedge retention system 500 that has at least one of its components made of a lightweight, high strength composite material will undergo significantly smaller displacements at these significantly higher rotational rotor speeds, the generator can be built with a smaller air gap between the main rotor 132 and main stator 134. Hence, a generator that is built with a main rotor 132 including a wedge retention system that has at least one of its components made of a lightweight high strength composite material will have a higher power to weight ratio than a generator built with a conventional wedge retention system.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A generator, comprising:
    a stator; and
    a rotor rotationally mounted at least partially within at least a portion of the stator, the rotor including:
        a shaft,
        at least a first and a second pole, each pole extending radially outwardly from the shaft and spaced apart from one another to form an interpole region therebetween,
        a first coil on the first pole, the first coil having at least an outwardly facing edge facing generally away from the shaft,
        a second coil on the second pole, the second coil having at least an outwardly facing edge facing generally away from the shaft, and
        an interpole retainer wedge positioned over at least a portion of the interpole region, and disposed between the outwardly facing edges of the first and second coils and surfaces of each of the first and second poles,
    wherein the interpole retainer wedge is constructed of a composite material.

2. The generator of claim 1, wherein the composite material is selected from the group consisting of a metal matrix composite and a polymer matrix composite.

3. The generator of claim 2, wherein the metal matrix composite comprises a high strength fiber reinforcing constituent in a metal base.

4. The generator of claim 3, wherein the high strength fiber reinforcing constituent is selected from the group consisting of carbon, boron, and carbide.

5. The generator of claim 3, wherein the metal base comprises aluminum.

6. The generator of claim 2, wherein the polymer matrix composite comprises high strength fibers in an epoxy.

7. The generator of claim 6, wherein the high strength fibers are selected from the group consisting of boron fibers, silicon carbide fibers, and carbon fibers.

8. The generator of claim 1, wherein the wedge retainer comprises:
    an intermediate section;
    a first side section extending from the intermediate section; and
    a second side section extending from the intermediate section,
    wherein the first and second side sections are dimensioned to fit between the first and second coil outwardly facing edges and the surfaces of each of the first and second poles.

9. The generator of claim 1, further comprising:
    a coil interpole wedge positioned in the interpole region and between the first and second coils.

10. A rotor for use in a generator, comprising:
    a shaft;
    at least a first and a second pole, each pole extending radially outwardly from the shaft and spaced apart from one another to form an interpole region therebetween;
    a first coil on the first pole, the first coil having at least an outwardly facing edge facing generally away from the shaft;
    a second coil on the second pole, the second coil having at least an outwardly facing edge facing generally away from the shaft; and
    an interpole retainer wedge positioned over at least a portion of the interpole region, and disposed between the first and second coil outwardly facing edges and surfaces of the first and second poles,
    wherein the interpole retainer wedge is constructed of a composite material.

11. The rotor of claim 10, wherein the composite material is selected from the group consisting of a metal matrix composite and a polymer matrix composite.

12. The rotor of claim 11, wherein the metal matrix composite comprises a high strength fiber reinforcing constituent in a metal base.

13. The rotor of claim 12, wherein the high strength fiber reinforcing constituent is selected from the group consisting of carbon, boron, and carbide.

14. The rotor of claim 12, wherein the metal base comprises aluminum.

15. The rotor of claim 11, wherein the polymer matrix composite comprises high strength fibers in an epoxy.

16. The rotor of claim 15, wherein the high strength fibers are selected from the group consisting of boron fibers, silicon carbide fibers, and carbon fibers.

17. The rotor of claim 10, wherein the interpole retainer wedge comprises:
    an intermediate section;
    a first side section extending from the intermediate section; and
    a second side section extending from the intermediate section, wherein the first and second side sections are dimensioned to fit between the first and second coil outwardly facing edges and the surface of the first and second poles.

18. The rotor of claim 10, further comprising:
a coil interpole wedge positioned in the interpole region and between the first and second coils.

19. An interpole retainer wedge for placement in an interpole region formed between adjacent coil wound poles of a generator rotor, the retainer wedge comprising:
an intermediate section;
a first side section extending from the intermediate section; and
a second side section extending from the intermediate section,
wherein the first and second side sections are dimensioned to fit between one or more surfaces of the coils and one or more surfaces of the adjacent poles, and
wherein the wedge retainer is constructed of a composite material.

20. The retainer of claim 19, wherein the composite material is selected from the group consisting of a metal matrix composite and a polymer matrix composite.

21. The retainer of claim 20, wherein the metal matrix composite comprises a high strength fiber reinforcing constituent in a metal base.

22. The retainer of claim 21, wherein the high strength fiber reinforcing constituent is selected from the group consisting of carbon, boron, and carbide.

23. The retainer of claim 21, wherein the metal base comprises aluminum.

24. The retainer of claim 20, wherein the polymer matrix composite comprises high strength fibers in an epoxy.

25. The retainer of claim 24, wherein the high strength fibers are selected from the group consisting of boron fibers, silicon carbide fibers, and carbon fibers.

* * * * *